(12) United States Patent
Li et al.

(10) Patent No.: US 10,823,890 B2
(45) Date of Patent: Nov. 3, 2020

(54) COLOR FILTER, MANUFACTURING METHOD THEREOF, DISPLAY PANEL

(71) Applicants: BEIJING BOE DISPLAY TECHNOLOGY CO., LTD., Beijing (CN); BOE TECHNOLOGY GROUP CO., LTD., Beijing (CN)

(72) Inventors: Pengchao Li, Beijing (CN); Lulu Chu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/400,313

(22) Filed: May 1, 2019

(65) Prior Publication Data

US 2020/0033515 A1   Jan. 30, 2020

(30) Foreign Application Priority Data

Jul. 24, 2018   (CN) .......................... 2018 1 0821670

(51) Int. Cl.
*G02B 5/20* (2006.01)
*G02B 3/08* (2006.01)
*G02F 1/1335* (2006.01)

(52) U.S. Cl.
CPC .............. *G02B 5/201* (2013.01); *G02B 3/08* (2013.01); *G02F 1/133512* (2013.01); *G02F 1/133516* (2013.01); *G02F 1/133526* (2013.01)

(58) Field of Classification Search
None
See application file for complete search history.

(56) References Cited

U.S. PATENT DOCUMENTS

| | | | | |
|---|---|---|---|---|
| 5,285,298 A | * | 2/1994 | Kaneko | G02F 1/132 345/87 |
| 6,417,022 B1 | * | 7/2002 | Hsiao | H01L 27/14627 438/70 |
| 6,524,772 B1 | * | 2/2003 | Huang | G02B 5/1814 216/26 |
| 2002/0058350 A1 | * | 5/2002 | Kim | H01L 27/14609 438/29 |
| 2007/0152228 A1 | * | 7/2007 | Choi | H01L 27/14621 257/98 |
| 2009/0130602 A1 | * | 5/2009 | Shim | H01L 27/14627 430/312 |
| 2010/0096359 A1 | * | 4/2010 | Shiu | B29D 11/00269 216/24 |

(Continued)

FOREIGN PATENT DOCUMENTS

| | | |
|---|---|---|
| CN | 101566751 | 10/2009 |
| CN | 104808383 | 7/2015 |

(Continued)

OTHER PUBLICATIONS

Chinese Office Action dated Apr. 26, 2020 corresponding to Chinese Patent Application No. 201810821670.8; 24 pages.

*Primary Examiner* — Ryan Crockett
(74) *Attorney, Agent, or Firm* — Leason Ellis LLP

(57) ABSTRACT

A color filter, a manufacturing method thereof and a display panel are provided. The color filter includes a base substrate and a color film layer on the base substrate, and the color film layer includes a lens unit.

17 Claims, 7 Drawing Sheets

(56) References Cited

U.S. PATENT DOCUMENTS

| | | | | |
|---|---|---|---|---|
| 2010/0243869 A1* | 9/2010 | Wano | ................ | H01L 27/14627 |
| | | | | 250/227.2 |
| 2011/0141765 A1 | 6/2011 | Chang et al. | | |
| 2014/0339509 A1* | 11/2014 | Choi | ..................... | H01L 27/322 |
| | | | | 257/40 |
| 2019/0189701 A1* | 6/2019 | Bang | ................... | H01L 27/3209 |
| 2020/0075653 A1* | 3/2020 | Seki | ......................... | G02B 5/20 |

FOREIGN PATENT DOCUMENTS

| | | | |
|---|---|---|---|
| CN | 105549238 | | 5/2016 |
| CN | 105629616 | | 6/2016 |
| CN | 106773306 | | 5/2017 |
| CN | 107357130 | | 11/2017 |
| CN | 207636808 | | 7/2018 |
| WO | WO 98/33091 | * | 7/1998 |

* cited by examiner providing a base substrate forming a color film layer on a surface of the base substrate

COLOR FILTER, MANUFACTURING METHOD THEREOF, DISPLAY PANEL

This application claims the benefit of Chinese patent application No. 201810821670.8 filed on Jul. 24, 2018, which is hereby entirely incorporated by reference as a part of the present application.

TECHNICAL FIELD

Embodiments of the present disclosure relate to a color filter, a manufacturing method thereof and a display panel.

BACKGROUND

With the development of display technology, display devices are widely used in daily life. With the improvement of living standards and the continuous development of the display technology, consumers have put forward more requirements for functions of the display devices. For example, for a consumer who needs to work frequently in public, the display device with an anti-peeping capability is desired to avoid the leaking out of work content. However, the cost of the display device having the anti-peeping capability is relatively high.

SUMMARY

At least one embodiment of the present disclosure provides a color filter including a base substrate and a color film layer disposed on the base substrate, and the color film layer includes a lens unit.

At least one embodiment of the present disclosure also provides a display panel including the color filter provided by any one of the embodiments of the present disclosure.

At least one embodiment of the present disclosure further provides a manufacturing method of a color filter, and the method includes: providing a base substrate; and forming a color film layer on a surface of the base substrate. Forming of the color film layer comprises forming a lens unit.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figures 6, 7:
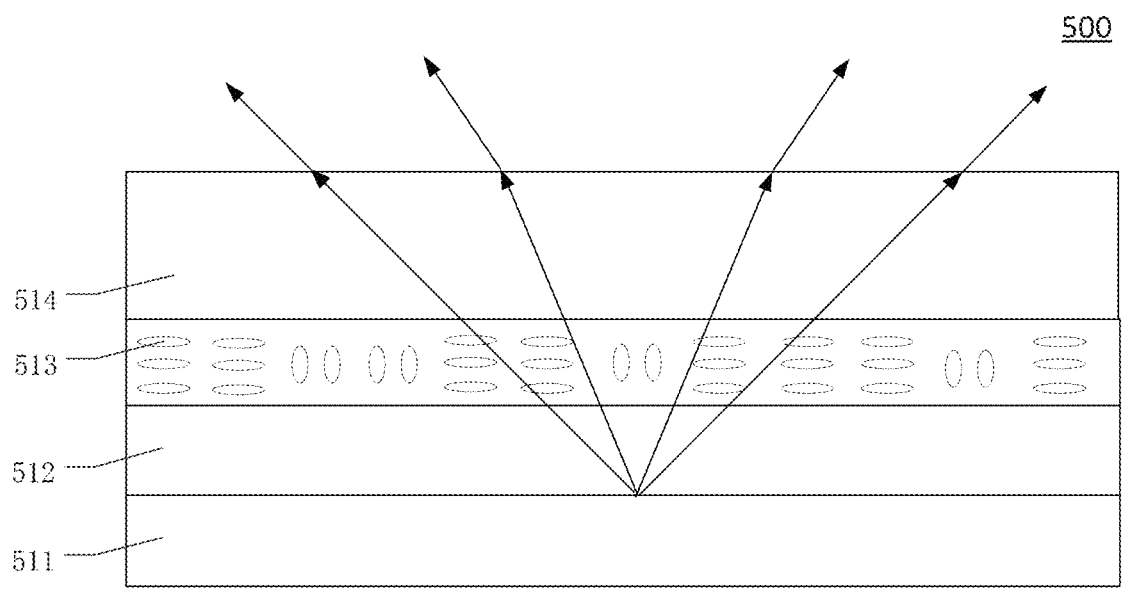
FIG. 6 is a schematic flowchart of a manufacturing method of a color filter provided by at least one embodiment of the present disclosure.
FIG. 7 is a schematic cross-sectional view of a liquid crystal display device.

FIG. 7 illustrates a liquid crystal display device. As illustrated in FIG. 7, the liquid crystal display device 500 includes a backlight module 511, an array substrate 512, a liquid crystal layer 513 and a color filter substrate 514 which are sequentially disposed. As illustrated in FIG. 7, the light emitted from the backlight module 511 passes through the array substrate 512 and the liquid crystal layer 513, and leaves the liquid crystal display device 500 via the color filter substrate 514. The inventors of the present disclosure have noted that because the divergence angle of the outgoing light leaving the liquid crystal display device 500 is large, a user that is not directly in front of the liquid crystal display device 500 can also observe the information displayed by the liquid crystal display device 500, that is, the liquid crystal display device 500 as illustrated in FIG. 7 has a large viewing angle and does not have an anti-peeping function.

Furthermore, the inventors of the present disclosure have also noted during research that the backlight module 511 may include a brightness enhancement film formed of a prism sheet to reduce the divergence angle of light that is incident on the brightness enhancement film. However, the inventors of the present disclosure have also noted during research that the brightness enhancement film formed of the prism sheet causes the formation of wrinkles (for example, causes the surface of the brightness enhancement film to be uneven), thus causes the phenomenon of non-uniform brightness exist in the backlight module 511, and thus reduces the display effect of the display panel and the display device which include the backlight module 511.

Embodiments of the present disclosure provide a color filter, a manufacturing method of a color filter and a display panel. The color filter includes a base substrate and a color film layer disposed on the base substrate, and the color film layer includes a Fresnel lens unit. By allowing the color film layer to include the Fresnel lens unit, the embodiments of the present disclosure can reduce the divergence angle of the divergent light that is incident on the color film layer without adding an additional film layer, and therefore, the viewing angle of the display panel and the display device which include the color filter can be reduced, and the display panel and the display device which include the color filter have the anti-peeping capability.

The color filter provided by the embodiments of the present disclosure will be described below with reference to a few examples. As described below, in case of no conflict, different features in these specific examples may be combined with each other, thereby obtaining new examples. These new examples are also within the scope of the disclosure.

Figure 1A:
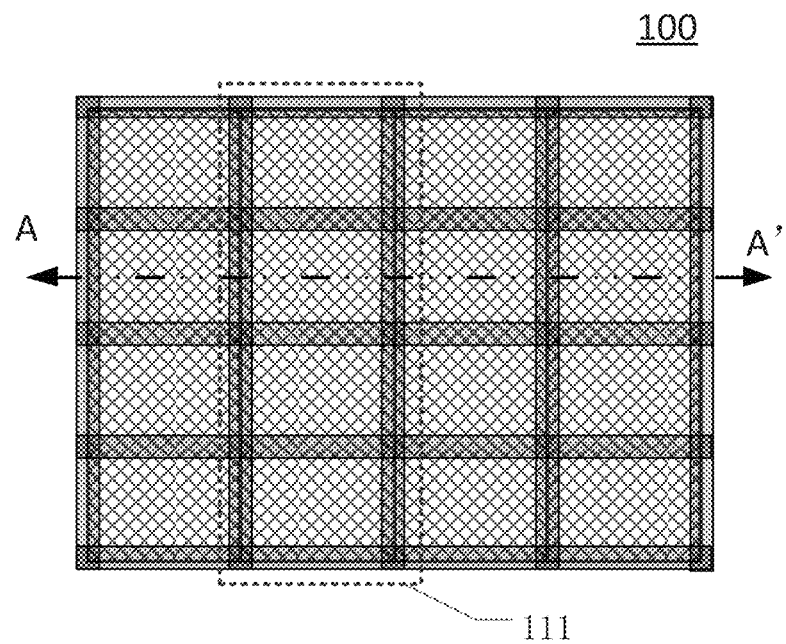
FIG. 1A is a schematic plan view of a color filter provided by at least one embodiment of the present disclosure.
Figure 1B:
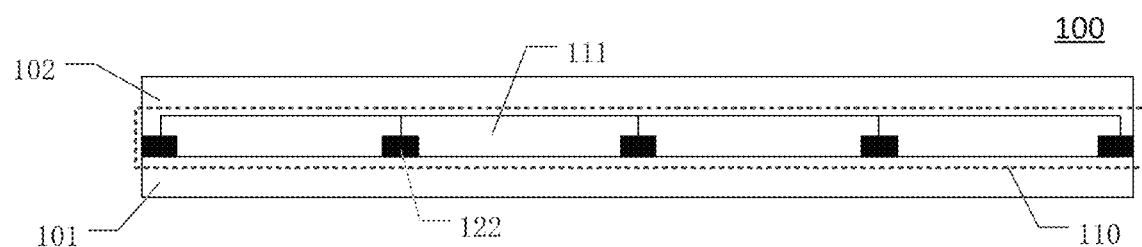
FIG. 1B is a cross-sectional view of the color filter as illustrated in FIG. 1A taken along line A-A'.

FIG. 1A and FIG. 1B are respectively a schematic plan view and a schematic cross-sectional view of the color filter 100 according to an embodiment of the present disclosure, and the schematic cross-sectional view as illustrated in FIG. 1B is taken along line A-A' as illustrated in FIG. 1A.

As illustrated in FIG. 1B, the color filter 100 includes a base substrate 101 and a color film layer 110 disposed on the base substrate 101. The color film layer 110 includes a Fresnel lens unit 111 (for example, a plurality of Fresnel lens units 111), and for example, the color film layer 110 includes a portion that forms the Fresnel lens unit 111 and a remaining portion. For example, the color filter 100 includes a pixel region and a peripheral region surrounding the pixel region, and the Fresnel lens unit 111 is formed in the pixel region and cooperates with, for example, a light emitter unit on the array substrate in a display panel to realize a display function; the peripheral region includes structures that are not used for the display (for example, structures that prevents light leakage, such as a black matrix or the like) or structures that cannot be viewed by a user, such as structures that establishes electrical connections. The specific structure and parameters of the Fresnel lens unit 111 can be set according to actual application requirements, no specific limitation will be given by the embodiments of the present disclosure in this respect.

Figure 1C:
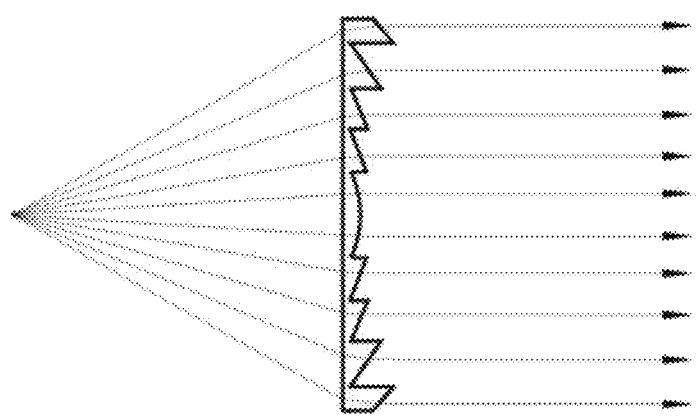
FIG. 1C is a schematic cross-sectional view of a Fresnel lens unit provided by at least one embodiment of the present disclosure.

For example, the Fresnel lens unit 111 can be implemented as a Fresnel lens as illustrated in FIG. 1C or a suitable modification thereof. As illustrated in FIG. 1C, a surface of the Fresnel lens unit 111 may include a curved surface (ellipsoidal curved surface) at a central portion of the Fresnel lens unit 111 and zigzag-shaped grooves in a peripheral region of the Fresnel lens unit 111; the widths (the widths in the direction in which the grooves are arranged) of the grooves and a groove spacing are, for example, equal, and angles of each groove and the groove adjacent to the each groove are, for example, different.

As illustrated in FIG. 1C, the Fresnel lens unit 111 can collimate divergent light that is incident thereon into collimated light (the collimated light has a same propagation direction). Therefore, in the case where the color filter 100 provided by the embodiments of the present disclosure is attached to a display substrate 210 (see FIG. 4A), without the need of adding an additional film layer, the color filter 100 can reduce the divergence angle of the outgoing light of the display substrate 210 (for example, the divergence angle of the outgoing light is reduced to zero) and the viewing angle of the display panel and the display device which include the color filter 100 while realizing a color filtering function, an therefore, the display panel and the display device which include the color filter 100 have the anti-peeping capability. For example, compared with a normal lens, the thickness of the Fresnel lens is smaller, and thus the color filter 100 provided by the embodiments of the present disclosure is advantageous for obtaining a thin display panel and a thin display device.

Figure 2A:
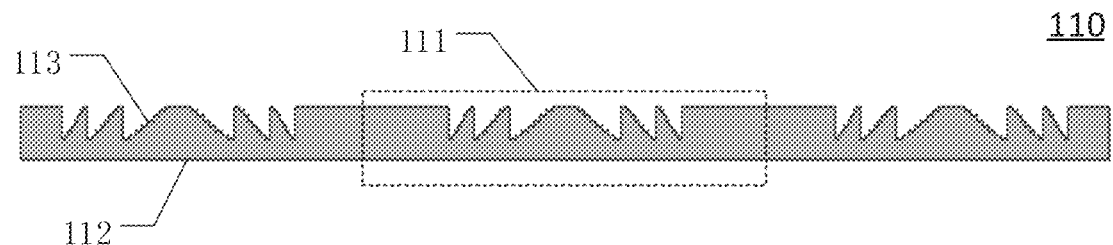
FIG. 2A is a schematic cross-sectional view of a color film layer provided by at least one embodiment of the present disclosure.
Figure 2B:
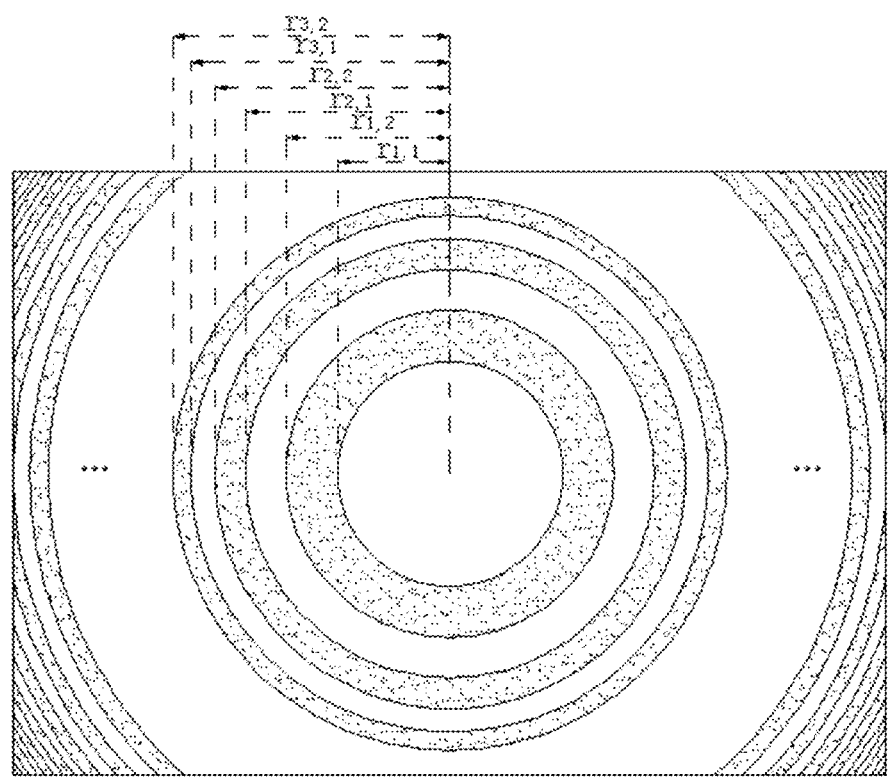
FIG. 2B is a schematic plan view of another Fresnel lens unit provided by at least one embodiment of the present disclosure.
Figure 2C:
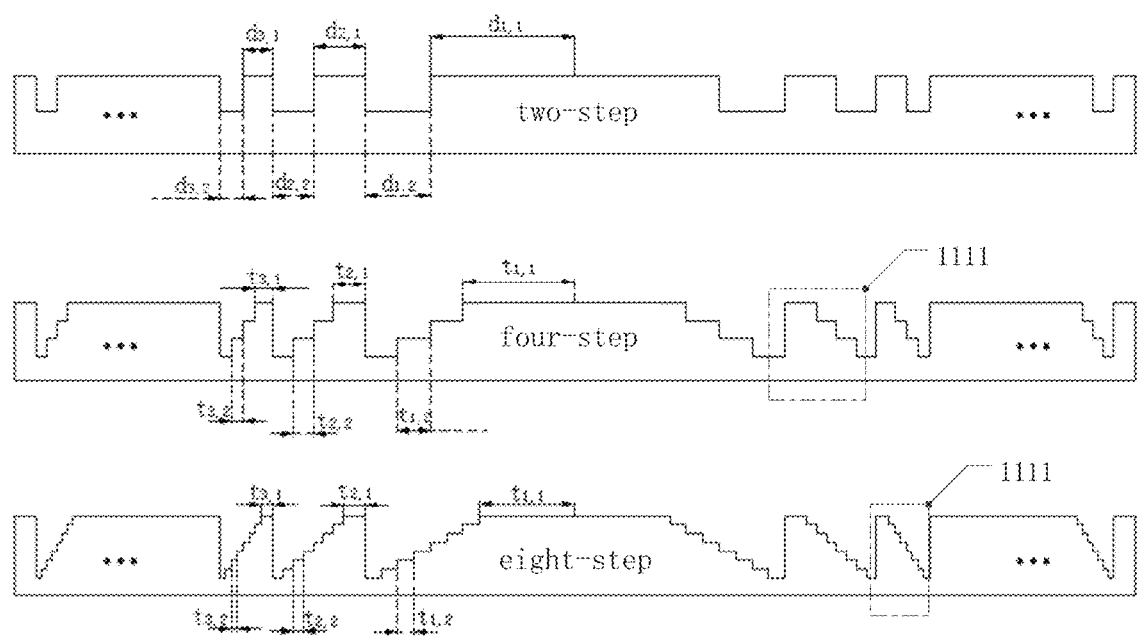
FIG. 2C is a schematic cross-sectional view of still another Fresnel lens unit provided by at least one embodiment of the present disclosure.

For example, according to actual application requirements, as illustrated in FIGS. 2A to 2C, the Fresnel lens unit 111 may be implemented as a phase Fresnel lens (for example a phase Fresnel lens based on binary optics), thereby reducing the manufacturing difficulty of the Fresnel lens unit 111 and the color film layer 110. For example, the phase Fresnel lens can be a two-step (two-level) Fresnel lens, a four-step (four-level) Fresnel lens, an eight-step (eight-level) Fresnel lens, a sixteen-step (sixteen-level) Fresnel lens, or other Fresnel lens with suitable steps (levels). For example, FIG. 2B illustrates a schematic plan view of the two-step Fresnel lens, and FIG. 2C illustrates a schematic cross-sectional view of the two-step Fresnel lens, the four-step Fresnel lens and the eight-step Fresnel lens.

For example, as illustrated in FIGS. 2B and 2C, the Fresnel lens may include M grating elements 1111 (for example, phase grating elements), and M is a positive integer (the specific value of M may be set based on the size of the Fresnel lens), and each grating unit 1111 may include $N=2^m$ ($m=1, 2, 3 \ldots$) steps; for the two-step Fresnel lens, the four-step Fresnel lens and the eight-step Fresnel lens, the values of m are respectively 1, 2 and 3. For example, the phase change, which is caused by each of the steps, of light that is incident on the each of the steps (that is, the phase difference between regions, in which two adjacent steps of the steps locates, of the Fresnel lens) may be $2\pi/N$, and a height of each of the steps may be $h=\lambda/(N \times (n1-n2))$, in which λ is a wavelength of incident light that is incident on the Fresnel lens (in the case where the incident light is white polychromatic light, a value of λ may be, for example, 587 nm), n1 is the refractive index of the Fresnel lens (for example, n1=1.4918), and n2 is the refractive index of the medium surround the Fresnel lens (for example, n2=1).

For example, as illustrated in FIG. 2B, for the two-step phase Fresnel lens, rj,1 (i.e., $r_{j,1}$) and rj,2 (i.e., $r_{j,2}$) are respectively radii of annuluses of the jth grating unit 1111, and j is a positive integer smaller than or equal to M. For example, rj,1 and rj,2 and a focal length value f' of the two-step phase Fresnel lens, the refractive index n of a medium in the object space and the image space of the two-step phase Fresnel lens, and the wavelength of the incident light satisfy the following relationship:

$$r_{j,1} = \left[\left(f' + \frac{(2j-1)\frac{\lambda}{2}}{n}\right)^2 - f'^2\right]^{1/2} = \sqrt{\frac{2(j-1)f'\lambda}{n}}\left(1 - \frac{(2j-1)\lambda}{4nf'}\right)^{1/2}$$

$$f_{j,2} = \left[\left(f' + \frac{j\lambda}{n}\right)^2 - f'^2\right]^{1/2} = \sqrt{\frac{2jf'\lambda}{n}}\left(1 - \frac{j\lambda}{2nf'}\right)^{1/2}.$$

The step widths dj,1 (i.e., $d_{j,1}$) and dj,2 (i.e., $d_{j,2}$) of the two-step Fresnel lens respectively satisfy the following formula:

$$d_{j,1} = r_{j,1} - r_{j-1,2}$$

$$d_{j,2} = r_{j,2} - r_{j,1}.$$

For example, as illustrated in FIG. 2C, for an N-step (N-level) phase Fresnel lens, each grating element 1111 includes N−1 steps (levels) having the same width (the N−1 steps having the same width are in sequence and adjacent steps of the N−1 steps are connected), one remaining step (in the central region of the phase Fresnel lens) of the N steps has a width different from the width of the above-mentioned N−1 steps, and the width tj,2 (i.e., $t_{j,2}$) of the N−1 steps in the jth grating unit 1111 and the width tj,1 (i.e., $t_{j,1}$) of the remaining step in the jth grating unit 1111 respectively satisfy the following formula:

$$t_{j,2} = \frac{d_{j,2}}{\frac{N}{2}}$$

$$t_{j,1} = d_{j,1} - \sum_{i=1}^{m-1} \frac{d_{j,2}}{2^i}.$$

For example, for the eight-step Fresnel lens, the width t1,2 of seven steps, which have same one width, in the first grating unit 1111, the width t1,1 of one remaining step in the first grating unit 1111, and the width t2,2 of seven steps, which have same one width, in the second grating elements 1111, the width t2,1 of one remaining step in the second grating elements 1111, the width t3,2 of seven steps, which have same one width, in the third grating unit 1111, and the width t3,1 of one remaining step in the third grating unit 1111 respectively satisfies the following formula:

$$t_{1,2} = \frac{d_{1,2}}{4},$$

$$t_{1,1} = d_{1,1} - \frac{d_{1,2}}{2} - \frac{d_{1,2}}{4},$$

$$t_{2,2} = \frac{d_{2,2}}{4},$$

$$t_{2,1} = d_{2,1} - \frac{d_{2,2}}{2} - \frac{d_{2,2}}{4},$$

-continued $$t_{3,2} = \frac{d_{3,2}}{4},$$

$$t_{3,1} = d_{3,1} - \frac{d_{3,2}}{2} - \frac{d_{3,2}}{4}.$$

The Fresnel lens unit 111 as illustrated in FIG. 2A to FIG. 2C can also collimate divergent light that is incident thereon into collimated light (the collimated light has a same propagation direction). Therefore, in the case where the color filter 100 including any Fresnel lens unit 111 as illustrated in FIG. 2A to FIG. 2C is attached to the display substrate 210 (see FIG. 4A), without the need of adding an additional film layer, the color filter 100 can reduces the divergence angle of the outgoing light of the display substrate 210 (for example, the divergence angle of the outgoing light is reduced to zero) and the viewing angle of the display panel and the display device which include the color filter 100 while realizing a color filtering function, an therefore, the display panel and the display device which include the color filter 100 have the anti-peeping capability.

Figure 2D:
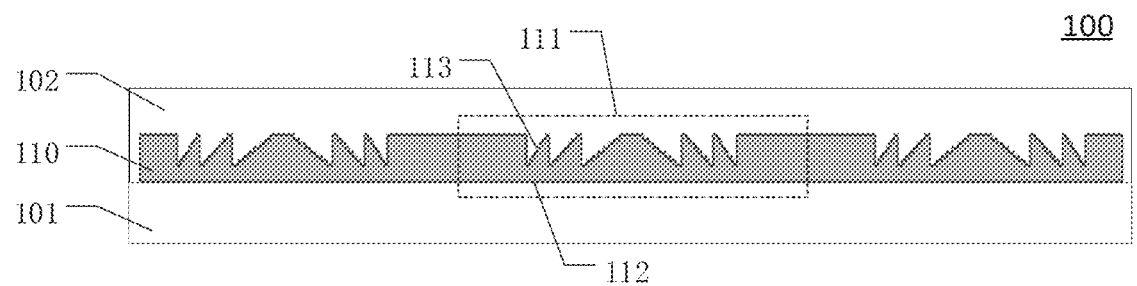
FIG. 2D is a schematic cross-sectional view of another color filter provided by at least one embodiment of the present disclosure.

As illustrated in FIG. 2A, the Fresnel lens unit 111 includes a flat surface 112 and a step surface 113. The step surface 113 includes, for example, the grooves as illustrated in FIG. 1C or the steps as illustrated in FIGS. 2A and 2C. For example, as illustrated in FIG. 2D, the color filter 100 may further include a planarization layer 102, and the planarization layer 102 covers the step surface 113, and allow the surface, on the side where the step surface 113 locates, of the color filter 100, to be a planarized surface. Thereby, the color filter 100 can be attached to other film layer of the display panel with better effect. For example, the refractive index of the planarization layer 102 is smaller than the refractive index of the Fresnel lens unit 111.

As illustrated in FIG. 2D, for example, the Fresnel lens unit 111 may be disposed on the base substrate 101 by the flat surface 112 (for example, the flat surface 112 is in direct contact with the base substrate 101). For example, according to actual application requirements, in the case where the color filter 100 includes the planarization layer 102, the Fresnel lens unit 111 may also be disposed on the base substrate 101 via the planarization layer 102 and the step surface 113 (i.e., the step surface 113 is closer to the base substrate 101 than the flat surface 112, and the portion, which is not covered by the planarization layer 102, of the step surface 113 may be in direct contact with the base substrate 101, for example).

For example, in the case where the step surface 113 is not covered by the planarization layer 102, the medium surrounds the Fresnel lens unit 111 is air, and therefore the refractive index n2 of the medium surrounds the Fresnel lens unit 111 is 1; in this case, the Fresnel lens unit 111 may be formed of a material having a refractive index of about 1.4 to 1.6 (for example, 1.48 to 1.55). For example, the Fresnel lens unit 111 may be formed of a color plexiglass resin. For example, the Fresnel lens unit 111 may be formed of, for example, a material including PMMA (polymethyl methacrylate), in which case the refractive index n1 of the Fresnel lens unit 111 is about 1.4918. Because a color resist and the Fresnel lens unit 111 can each be formed of the color plexiglass resin, the color filter 100 provided by the embodiments of the present disclosure can reduce the divergence angle of the divergent light that is incident on the color film layer 110 without adding an additional film layer, thereby making the display panel and the display device which include the color filter 100 have the anti-peeping capability.

For example, as illustrated in FIG. 2D, in the case where the step surface 113 is covered by the planarization layer 102, the Fresnel lens unit 111 may be formed of a material having a refractive index of about 1.7 to 1.9 (for example, 1.75 to 1.85). The refractive index of the Fresnel lens unit 111 can be, for example, about 1.8, and the planarization layer 102 can be formed of a material having a refractive index of about 1.2 to 1.4 (for example, 1.25 to 1.35). The refractive index of the planarization layer 102 can be, for example, about 1.3; in this case, the refractive index n2 of the medium surrounds the Fresnel lens unit 111 may be, for example, about 1.3.

For example, the planarization layer 102 and the Fresnel lens unit 111 may each be made from a color photoresist material according to actual application requirements, but embodiments of the present disclosure are not limited thereto; for example, by adjusting the base material of the color photoresist material, the refractive index of the color photoresist material for forming the Fresnel lens unit 111 may be larger than the refractive index of the color photoresist material for forming the planarization layer 102. For example, by making both the planarization layer 102 and the Fresnel lens unit 111 be made from the color photoresist material, it is possible to avoid the potential adverse effect of the unevenness of the thickness of the color film layer on the uniformity of the intensity of the outgoing light, thereby improving the display effect of the display panel and the display device which include the color filter 100.

Figure 3A:
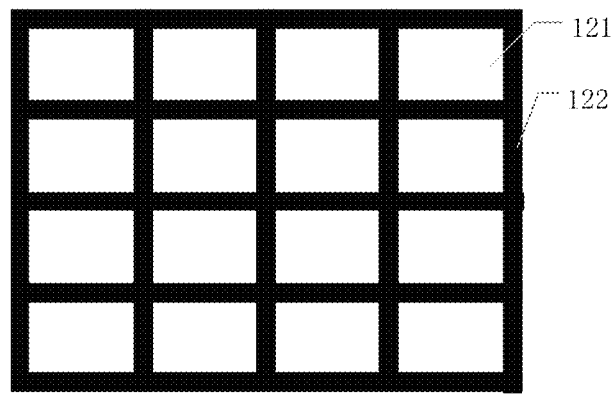
FIG. 3A is a schematic plan view of a black matrix layer according to at least one embodiment of the present disclosure.
Figure 3B:
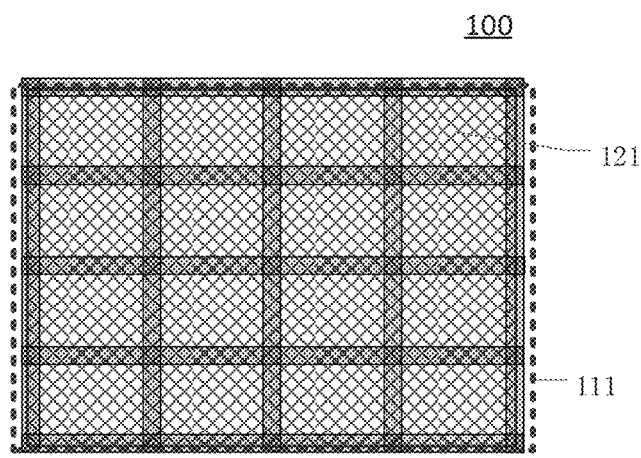
FIG. 3B is a schematic plan view of still another color filter provided by at least one embodiment of the present disclosure.
Figure 3C:
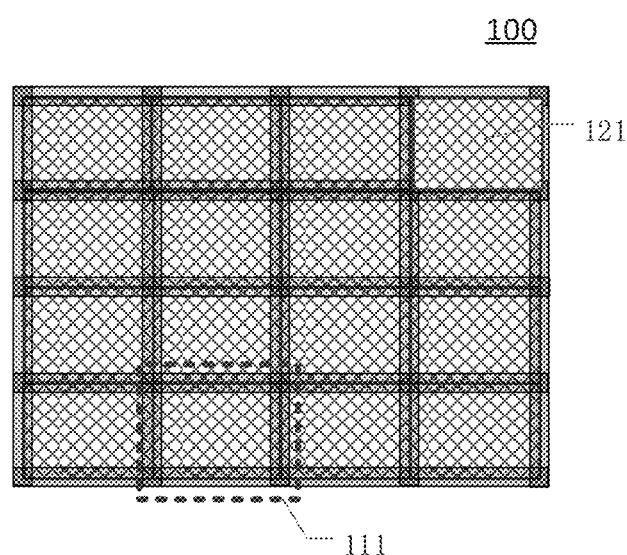
FIG. 3C is a schematic plan view of still another color filter provided by at least one embodiment of the present disclosure.

For example, as illustrated in FIG. 3A to FIG. 3C, the color filter 100 may further include a black matrix layer 122 for preventing light mixing, the black matrix layer 122 defines a plurality of pixel units 121 (the plurality of pixel units 121 arranged in an array), and the Fresnel lens unit 111 is disposed in one or more of the pixel units 121.

For example, as illustrated in FIG. 3B, each Fresnel lens unit 111 may be disposed in a plurality of pixel units 121 (for example, part of the pixel units 121 defined by black matrix layer 122), thereby reducing the number of the Fresnel lens units 111 included by the color film layer 110 and reducing the manufacturing difficulty of the color film layer 110. For example, as illustrated in FIG. 3B, the color filter 100 may include only one Fresnel lens unit 111, and the only one Fresnel lens unit 111 is disposed in all of the pixel units 121 included in the color filter 100, and is used for reducing the divergence angle of the outgoing light exited from all the pixel units 121 included in the color filter 100 (for example, the only one Fresnel lens unit 111 collimates the outgoing light exited from all the pixel units 121 included in the color filter 100 into the collimate light). For another example, as illustrated in FIG. 3C, the color filter 100 may include a plurality of Fresnel lens units 111, and the plurality of Fresnel lens units 111 correspond to the plurality of pixel units 121 in a one-to-one manner, that is, each Fresnel lens unit 111 is disposed in the pixel unit 121 corresponding to the each Fresnel lens unit 111 (for example, each Fresnel lens unit 111 may be disposed in only one pixel unit 121 corresponding to the each Fresnel lens unit 111); each Fresnel lens unit 111 is configured to reduce the divergence angle of the outgoing light exited from one of the pixel units 121 corresponding to the each Fresnel lens unit 111 (for example, each Fresnel lens unit 111 collimates the outgoing light exited from the one of the pixel units 121 corresponding to the each Fresnel lens unit 111 into collimated light); in this case, the uniformity of the intensity of the outgoing light exited from the color filter 100 can be improved.

For example, in one example, the Fresnel lens unit 111 may include one pixel unit 121; or, for example, in another example, the color film layer comprises a plurality of pixel units 121, and the Fresnel lens unit 111 may further include a first number of pixel units out of pixel units 121, for example, the number of the first number pixel units of the Fresnel lens unit is smaller than or equal to the number of the plurality of pixel units 121 of the color film layer. For example, the first number of pixel units 121 of the Fresnel lens unit are in same one direction.

For example, in the case where the Fresnel lens unit 111 includes one of the pixel units 121, the Fresnel lens unit 111 may be formed of a red plexiglass resin, a green plexiglass resin, or a blue plexiglass resin, in which case, one of the pixel units 121 corresponds to one of display sub-pixels (for example, one of the display sub-pixels of the display device or the display panel); for another example, in the case where the Fresnel lens unit 111 includes one of the pixel units 121, the Fresnel lens unit 111 may also be formed of the red plexiglass resin, the green plexiglass resin and the blue plexiglass resin, in which case, one of the pixel units 121 corresponds to, for example, three of the display sub-pixels (for example, three of the display sub-pixels of the display device or the display panel).

For example, as illustrated in FIG. 2B, the orthographic projection of the step surface 113 of the Fresnel lens unit 111 on the base substrate 101 is center-symmetrical, and in this case, the display panel and the display device which include the Fresnel lens unit 111 have the anti-peeping capability in both the horizontal direction and the vertical direction, but embodiments of the present disclosure are not limited thereto. For another example, as illustrated in FIG. 1A, in the case where the display panel and the display device only need to have the anti-peeping capability in the horizontal direction, the Fresnel lens unit 111 may be implemented as a columnar Fresnel lens, that is, the orthographic projection of the step surface 113 of the Fresnel lens unit 111 on the base substrate 101 is rectangular and is axisymmetric but not center-symmetrical, in which case, the Fresnel lens unit 111 has an outline in a long strip shape and each Fresnel. The lens unit 111 corresponds to a plurality of pixel units 121 (for example, all of the pixel units 121 located in a same column) arranged in the same direction (for example, arranged in an extension direction of a column).

In the color filter provided by the embodiments of the present disclosure, by making the color film layer include the Fresnel lens unit, the divergence angle of the divergent light that is incident on the color film layer can be reduced without adding an additional film layer, and this can reduce the viewing angles of the display panel and the display device which include the color filter, and make the display panel and the display device which include the color filter have the anti-peeping capability.

Figure 4A:
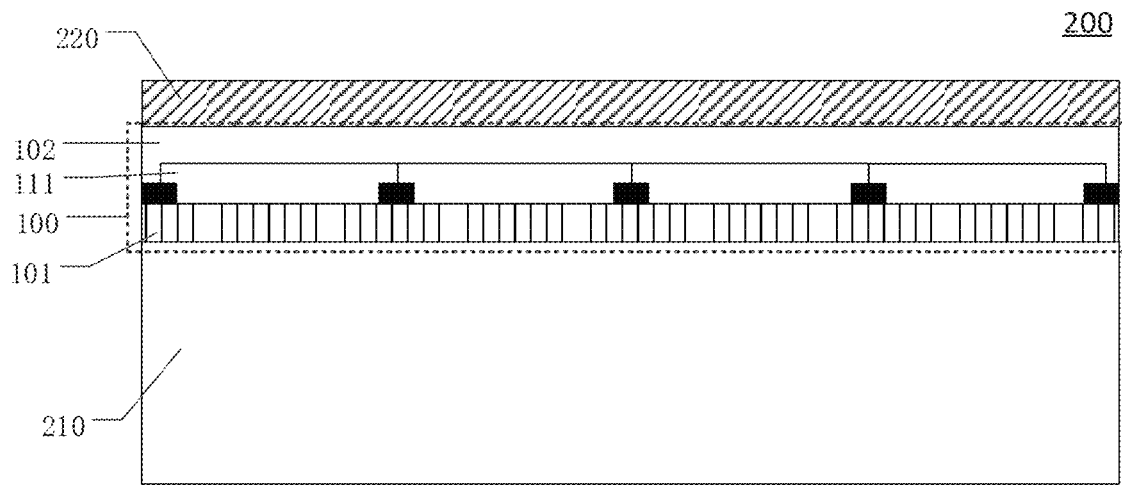
FIG. 4A is a schematic cross-sectional view of a display panel provided by at least one embodiment of the present disclosure.
Figure 4B:
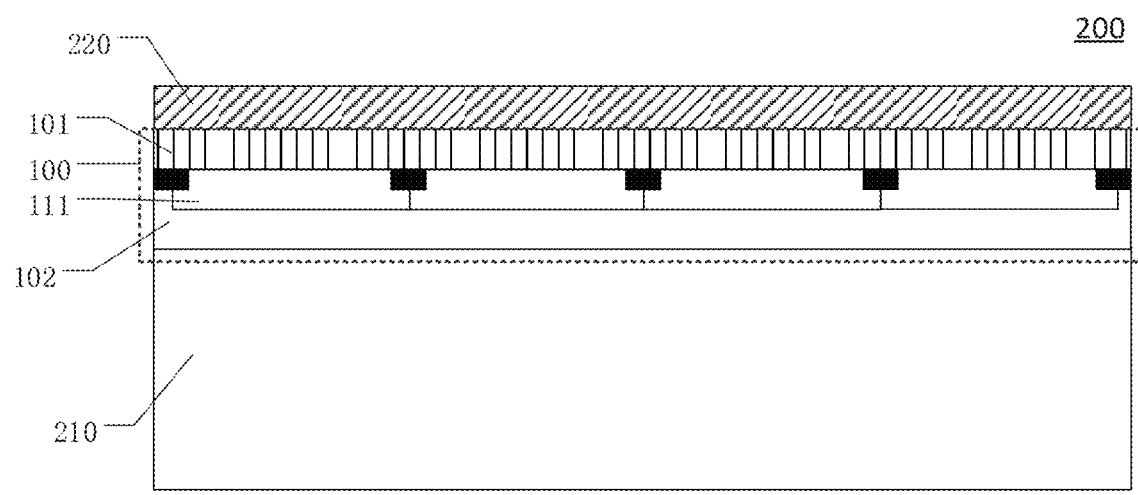
FIG. 4B is a schematic cross-sectional view of another display panel provided by at least one embodiment of the present disclosure.

As illustrated in FIG. 4A and FIG. 4B, at least one embodiment of the present disclosure further provides a display panel 200 including a display substrate 210 and the color filter 100 provided by any embodiment of the present disclosure. The display substrate 210 may be implemented as a liquid crystal display substrate (for example, an array substrate of a liquid crystal display panel) or an organic light-emitting diode display substrate (for example, a display back panel of an organic light-emitting diode display panel). The display substrate 210 is configured to emit divergent light, and the Fresnel lens unit 111 is configured to collimate the divergent light into collimated light.

At least one embodiment of the present disclosure also provides a display device including the display panel provided by any one of the embodiments of the present disclosure. For example, the display device may be any product or component having a display function, such as a mobile phone, a tablet computer, a television, a display, a notebook computer, a digital photo frame, a navigator, and the like.

For example, as illustrated in FIG. 4A, the display substrate 210 may be disposed on the side of the base substrate 101 away from the color film layer 110, in which case, the display substrate 210 may be in direct contact with the base substrate 101 of the color filter 100; for another example, as illustrated in FIG. 4B, the display substrate 210 may be disposed on the side of the color film layer 110 away from the base substrate 101, in which case, the display substrate 210 may be in direct contact with the planarization layer 102 or the color film layer 110 of the color filter 100.

For example, as illustrated in FIGS. 4A and 4B, the display panel 200 further includes a polarizer 220 disposed on the side of the color filter 100 away from the display substrate 210. For example, as illustrated in FIG. 4A, the polarizer 220 may be in direct contact with the planarization layer 102 of the color filter 100; for another example, as illustrated in FIG. 4B, the polarizer 220 may also be in direct contact with the base substrate 101 of the color filter 100; for still another example, according to actual application requirements, the polarizer 220 may be in direct contact with a partial region of the step surface of the Fresnel lens unit 111 of the color filter 100 and a planarization layer covering another partial region of the Fresnel lens unit 111.

For example, the separation distance between the color filter 100 and the display substrate 210 is equal to the focal length of the Fresnel lens unit 111, and therefore, the light emitted by the display substrate 210 can be collimated into collimate light, and the anti-peeping capability of the display panel 200 can be further improved. It should be noted that the separation distance between the color filter 100 and the display substrate 210 is the separation distance between the color film layer 110 of the color filter 100 and the light-emitting surface of the display substrate 210. Illustrative description is given below by taking the case that the display substrate 210 is implemented as a liquid crystal display substrate as an example.

Figure 5A:
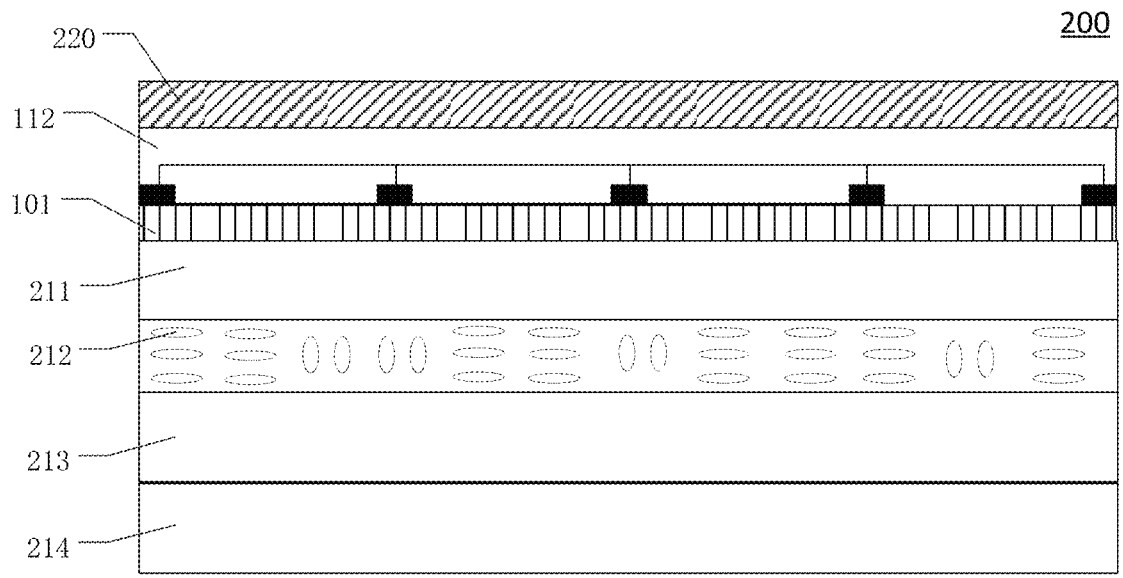
FIG. 5A is a schematic cross-sectional view of still another display panel according to at least one embodiment of the present disclosure.
Figure 5B:
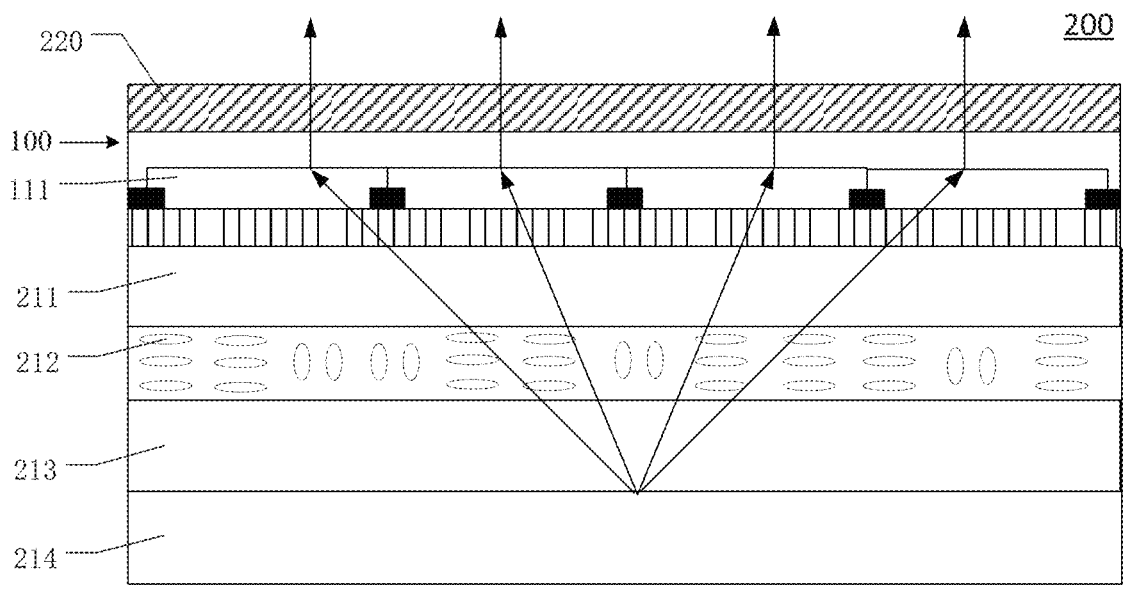
FIG. 5B is a schematic diagram for illustrating an optical path of light emitted by the display panel illustrated in FIG. 5A.

As illustrated in FIG. 5A and FIG. 5B, the display panel 200 provided by the embodiments of the present disclosure may include a backlight module 214, an array substrate 213, a liquid crystal layer 212, a color filter substrate 211 and the color filter 100 which are disposed in sequence; the separation distance between the color filter 100 and the display substrate 210 is the separation distance between the color film layer 110 of the color filter 100 and the light-emitting surface of the backlight module 214.

For example, the Fresnel lens unit 111 in the color filter 100 provided by the embodiments of the present disclosure can reduce the divergence angle of the outgoing light emitted from the display panel 200. Therefore, according to actual application requirements, the backlight module 214 may be not provided with a brightness enhancement film formed by a prism sheet, this can inhibit the formation of sheet wrinkle, and can improve the uniformity of the brightness of the backlight module 214, thereby improving the display effect of the display device including the color filter 100.

It should be noted that other components (for example, a thin film transistor, a controller device, an image data encoding/decoding device, a row scan driver, a column scan driver, a clock circuit, etc.) of the display panel and the display device may adopt suitable components, this should be understood by those skilled in the art, no further descriptions will be given herein and it should not be construed as a limitation on the embodiments of the present disclosure. The display panel and the display device have the anti-peeping capability.

For example, based on the same inventive concept, at least one embodiment of the present disclosure also provides a manufacturing method of a color filter. The manufacturing method of the color filter includes: providing the base substrate; and forming the color film layer on a surface of the base substrate. For example, forming of the color film layer comprises forming a lens unit.

For example, FIG. 6 is a flowchart of the manufacturing method of the color filter provided by at least one embodiment of the present disclosure. Taking the case illustrated in FIG. 1A as an example, as illustrated in FIG. 6, the manufacturing method may include the following steps.

Step S10: providing the base substrate.

Step S20: forming the color film layer on a surface of the base substrate.

For example, the base substrate may be a glass substrate, a quartz substrate, a plastic substrate (for example, a polyethylene terephthalate (PET) substrate), or a base substrate formed of other suitable materials.

For example, the color film layer may be formed of plexiglass (for example, at least one of a red photoresist material, a green photoresist material and a blue photoresist material). For example, depending on the material for forming the color film layer, the color film layer may be formed by an imprint method, a mechanical processing method or an etching method. For example, the specific manufacturing process of the imprint method, the mechanical processing method or the etching method may be referred to related art, and details are not described here.

For example, the manufacturing method may further include the following step S30.

Step S30: forming the planarization layer on the surface of the color film layer away from the base substrate.

For example, the planarization layer may be formed of a transparent insulation material, and the planarization layer may be formed of, for example, an organic resin, silicon oxide ($SiO_x$), silicon oxynitride ($SiN_xO_y$), or silicon nitride ($SiN_x$); for another example, the planarization layer can be formed of a material with filtering capability (for example, a material capable of filtering a part of visible light), and the planarization layer can also be formed by, for example, the color photoresist material (for example, at least one of the red photoresist material, the green photoresist material and the blue photoresist material), or other organic insulation material or inorganic insulation material.

For example, the color filter formed by the color filter manufacturing method provided by the embodiments of the present disclosure can reduce the divergence angle of the outgoing light exited from the display substrate (for example, reduce the divergence angle of the outgoing light to zero), thereby reducing the viewing angle of the display panel and the display device which include the color filter, and the therefore, display panel and the display device which include the color filter have the anti-peeping capability.

At least one embodiment of the present disclosure provides the color filter, the manufacturing method of the color filter and the display panel. The color filter can reduce the viewing angle of the display panel including the color filter, thereby making the display panel including the color filter have the anti-peeping capability.

Although the present disclosure has been described in detail with reference to general descriptions and specific embodiments in the above content, it will be apparent for those skilled in the art to make modifications or improvements on the basis of the embodiments of the present disclosure, and these modifications or improvements without departing from the spirit of the present disclosure fall within the scope of the present disclosure.

What are described above is related to the illustrative embodiments of the disclosure only and not limitative to the scope of the disclosure; the scopes of the disclosure are defined by the accompanying claims.

What is claimed is:

1. A color filter, comprising a base substrate and a color film layer on the base substrate,
wherein the color film layer comprises a lens unit;
the color film layer is configured to reduce a divergence angle of divergent light that is incident on the color film layer in operation;
the lens unit is formed of a color plexiglass resin or a color photoresist material;
the lens unit is a Fresnel lens unit;
the color filter further comprises a planarization layer at a side of the color film layer away from the base substrate;
the Fresnel lens unit comprises a flat surface and a step surface;
the planarization layer covers the step surface to allow a surface which is on a side, provided with the step surface, of the color filter to be a planarized surface; and
the planarization layer has a refractive index that is smaller than a refractive index of the Fresnel lens unit.

2. The color filter according to claim 1, wherein the Fresnel lens unit is between the planarization layer and the base substrate.

3. The color filter according to claim 1, wherein the color film layer comprises a plurality of pixel units arranged in an array, and the Fresnel lens unit comprises one of the plurality of pixel units.

4. The color filter according to claim 1, wherein the color film layer comprises a plurality of pixel units, and the Fresnel lens unit comprises a first number of pixel units out of the plurality of pixel units of the color film layer.

5. The color filter according to claim 4, wherein the first number of pixel units of the Fresnel lens unit are in same one direction.

6. The color filter according to claim 1, wherein the Fresnel lens unit is a phase Fresnel lens.

7. The color filter according to claim 6, wherein the Fresnel lens unit is on the base substrate by the flat surface.

8. The color filter according to claim 7, wherein the color film layer comprises a plurality of pixel units arranged in an array, and the Fresnel lens unit comprises one of the pixel units.

9. The color filter according to claim 7, wherein the color film layer comprises a plurality of pixel units, and the Fresnel lens unit comprises a first number of pixel units out of the plurality of pixel units of the color film layer.

10. The color filter according to claim 1, wherein the color film layer is configured to collimate divergent light that is incident on the color film layer into collimated light in operation.

11. A display panel, comprising a color filter,
wherein the color filter comprises a base substrate and a color film layer on the base substrate, and the color film layer comprises a lens unit;
the color film layer is configured to reduce a divergence angle of divergent light that is incident on the color film layer in operation;
the lens unit is formed of a color plexiglass resin or a color photoresist material;
the display panel further comprises a display substrate;
the display substrate and the color filter are stacked, and a separation distance between the color filter and the display substrate is equal to a focal length of the Fresnel lens unit; and
the display substrate is configured to emit divergent light, and the Fresnel lens unit is configured to collimate the divergent light into collimated light.

12. The display panel according to claim 11 wherein the display substrate is on a side, which is away from the base substrate, of the color film layer of the color filter.

13. The display panel according to claim 11 wherein the display substrate is on a side of the base substrate away from the color film layer.

14. The display panel according to claim 11, further comprising a polarizer wherein the polarizer is on a side of the color filter away from the display substrate.

15. A manufacturing method of a color filter, comprising:
providing a base substrate; and
forming a color film layer on a surface of the base substrate,
wherein forming of the color film layer comprises forming a lens unit;
the color film layer is configured to reduce a divergence angle of divergent light that is incident on the color film layer in operation; and
the lens unit is formed of a color plexiglass resin or a color photoresist material;
the lens unit is a Fresnel lens unit;
the color filter further comprises a planarization layer at a side of the color film layer away from the base substrate;
the Fresnel lens unit comprises a flat surface and a step surface;
the planarization layer covers the step surface to allow a surface which is on a side, provided with the step surface, of the color filter to be a planarized surface; and
the planarization layer has a refractive index that is smaller than a refractive index of the Fresnel lens unit.

16. The manufacturing method of the color filter according to claim 15, wherein the lens unit of the color film layer is formed by an imprint method.

17. The manufacturing method according to claim 15, wherein the color film layer is configured to collimate divergent light that is incident on the color film layer into collimated light in operation.

* * * * *